Figure 1:
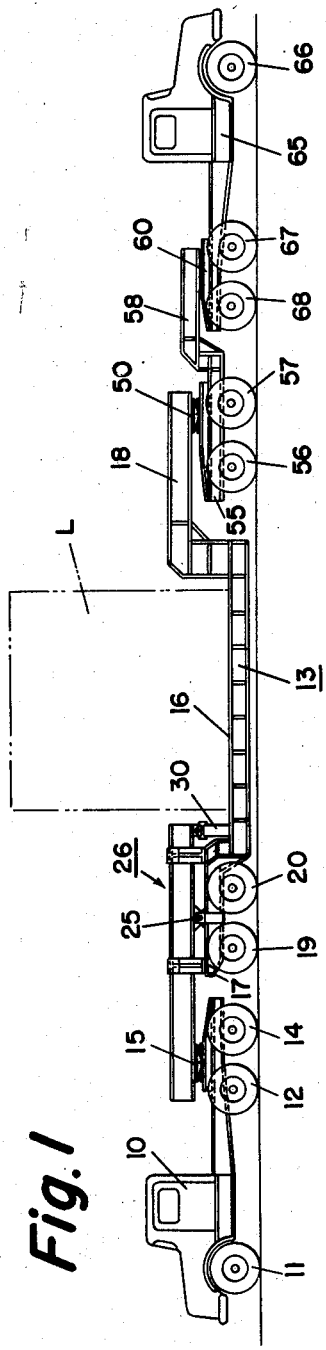

Dec. 4, 1956    G. F. HAKE ET AL    2,772,892
LOAD DISTRIBUTING GOOSENECK FOR LOW BED TRAILER
Filed Dec. 6, 1954    2 Sheets-Sheet 1

INVENTORS.
GLENN F. HAKE
JAMES D. HAKE
BY Joseph Rossman
ATTORNEY

Dec. 4, 1956  G. F. HAKE ET AL  2,772,892
LOAD DISTRIBUTING GOOSENECK FOR LOW BED TRAILER
Filed Dec. 6, 1954  2 Sheets-Sheet 2

INVENTORS.
GLENN F. HAKE
BY JAMES D. HAKE

ATTORNEY

United States Patent Office 2,772,892
Patented Dec. 4, 1956

2,772,892

LOAD DISTRIBUTING GOOSENECK FOR LOW BED TRAILER

Glenn F. Hake and James D. Hake, Philadelphia, Pa.

Application December 6, 1954, Serial No. 473,186

6 Claims. (Cl. 280—405)

This invention relates to highway tractor-trailer combinations and particularly to heavy duty low bed trailers and goosenecks therefor for distributing the load.

Extremely heavy and bulky loads are frequently hauled on heavy duty low bed trailers in which the bed of the trailer is kept as low as possible. In order to meet existing road and bridge conditions in the various states and cities, while hauling bulky and over-weight objects from a point of origin to a point of destination, it was found necessary to add extra wheels and axles to existing equipment, so as to afford greater weight distribution of the load on highways and bridges. It has also been proposed to provide a tractor train of a plurality of semi-trailers suitably connected so as to distribute the load. In such trains, the rear of the trailer body may be supported on detachable wheel assemblies and the front end of the trailer is supported by a suitable upwardly and then forwardly extending gooseneck, the gooseneck carrying a downwardly exposed fifth wheel member so as to detachably support the front end of the trailer on a complementary upwardly exposed fifth wheel member on the rear of a tractor or front wheel assembly. The body, or load supporting platform, of such trailers is positioned at as low a level as possible so as to lower the center of gravity of the heavy loads and to permit clearance beneath bridges and other overhead obstructions across the highways. In all such prior equipment satisfactory load distribution has not been possible where extremely heavy loads are hauled.

According to the present invention we have been able to achieve load distribution by installing a walking beam or rear gooseneck at the rear end of the platform of a low bed trailer. This walking beam or rear gooseneck is supported on the rear of the low bed trailer by means of hinged fulcrums and in addition pressure is also exerted upwardly upon it by means of a plurality of adjustable spring members carried by the low bed trailer which exert a constant pressure. The rear walking beam relieves a proportion of the weight on the highway at this point and transmits the weight to another vehicle in the train. This combination of elements may be used in any suitable tractor train comprised of a plurality of semi-trailers for achieving desired load distribution on highways.

Figure 2:
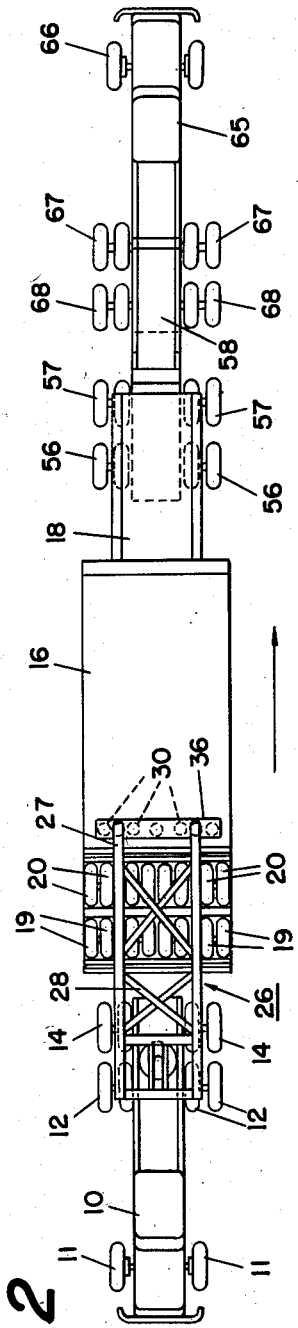
Figure 3:
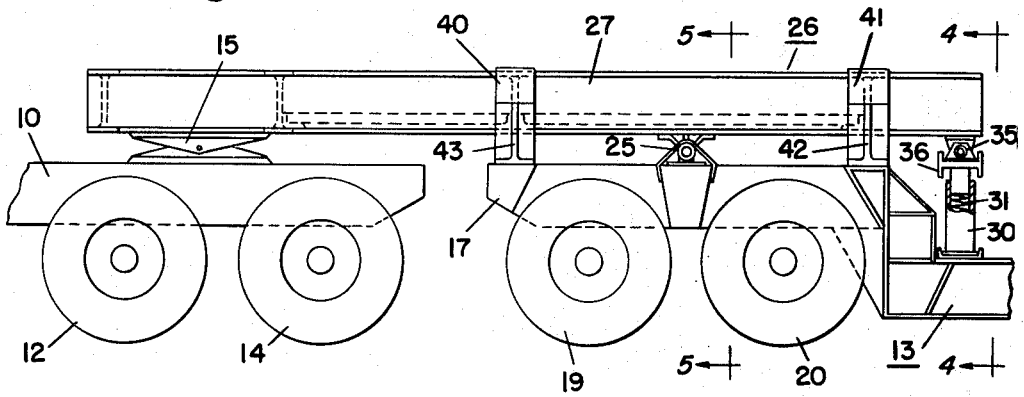
Figure 4:
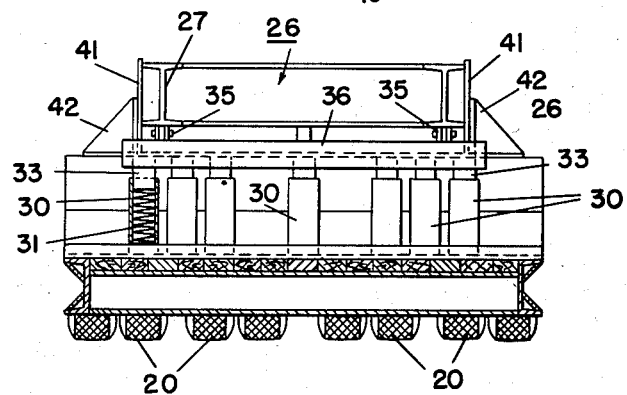
Figure 5:
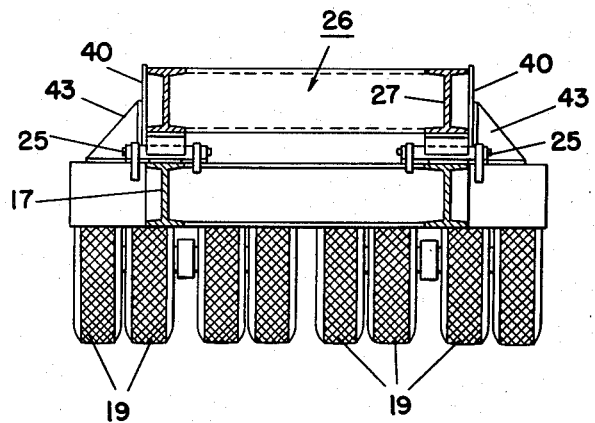

Further details and advantages of our invention will be apparent from the following description and accompanying drawings, wherein:

Figure 1 is a diagrammatic side elevation of a tractor train embodying our invention, Figure 2 is a plan view of the tractor train elements shown in Figure 1, Figure 3 is an enlarged fragmental side elevation of the pivoted walking beam constructed in accordance with our invention, Figure 4 is a view taken on lines 4—4 of Figure 3, and Figure 5 is a view taken on lines 5—5 of Figure 3.

Referring to the drawings, an illustrative tractor-train is shown in Figures 1 and 2 which will be described starting with the units at its rear end to which has been added a pusher tractor. The direction of movement of the connected train is indicated by the arrow in Figure 2. The tractor train consists of a powered rear tractor 10 provided with front wheels 11 and four spaced pairs of rear wheels designated by numerals 12 and 14. A suitable conventional fifth wheel or connection 15 is provided preferably forward of the axle of the rear wheels 12.

A low bed trailer, designated generally by numeral 13, comprises a low hung platform 16 carried by a rear extension 17 and a front extension 18. Extension 17 carries two series of eight wheels each designated respectively by numerals 19 and 20. Rear extension 17 is also provided with two spaced fulcrums 25 which pivotally support a walking beam, designated generally by numeral 26. (See Figure 5.) The walking beam 26 is constructed of a plurality of I-beams 27 and reinforcing cross-beams 28, as shown in Figure 2.

A plurality of spring containing units, designated by numeral 30, are fixedly positioned at the rear end of the low bed trailer platform 16, as shown in Figures 1 and 2. The spring units 30 may be of any conventional construction as described for example in Reissue Patent 22,980, March 9, 1948. Such spring units each consist of an outer casing 30 enclosing a pre-compressed spring 31 confined between the casing and a movable member 33, as shown in Figure 4. The movable members 33 are adapted to yieldably support a load within predetermined limits depending upon the initial predetermined compression of the spring 31.

The front end of the walking beam 26 is pivotally connected by two spaced pivoted brackets 35 to a transverse channel-beam 36 which is adapted to be freely supported across the movable elements 33 of the spring units 30, as shown in Figures 3 and 4. The walking beam 26 is provided with pairs of spaced guide plates 40 and 41 which are adapted to contact spaced brackets 42 and 43 affixed to extension 17 of the low bed trailer thereby limiting any lateral movement of the pivoted walking beam 26.

The rear end of the walking beam 26 is provided with a conventional fifth wheel 15 which is adapted to be supported on the rear end of the rear tractor 10, whereby the load transmitted by the walking beam 26 will be supported by the rear portion of the tractor 10.

The front extension 18 of the low bed trailer 13 is provided with a suitable conventional fifth wheel 50 which is supported on a conventional wheeled dolly 55 provided with four pairs of spaced wheels 56 and 57. The dolly 55 is also provided with an extension 58 which is connected by a suitable fifth wheel 60 to the rear extension of a forward or leading power tractor 65 having a pair of front wheels 66 and two spaced pairs of rear wheels 67 and 68.

For regular road work on average level roads the springs 31 may be adjusted for example on a 150 ton low bed trailer of the type illustrated in Figures 1 and 2 so as to maintain an upward pressure against the walking beam 26 of about 80,000 lbs. of which pressure approximately one-half will be transmitted through the walking beam 26 to the rear end of the rear tractor 10 and at the fifth wheel 15 the downward pressure will be about 40,000 lbs., thereby relieving the load on the rear of the low bed trailer 13 in direct proportion or aproximately 40,000 lbs. Thus the weight which is transmitted to the rear tractor 10 will be proportioned between the three axles of the tractor 10 which carries 10 wheels, thus giving a much more even distribution of the load on the highways and bridges over which the tractor train may travel.

The battery of springs in the given spring units 30 are provided with adjustable springs as previously described which can exert a constant pressure of between 6,000 lbs. each or 42,000 lbs. total at the high position to a pressure of 14,000 lbs. each or a total of 98,000 lbs. at the low position. The initial set of the rear walking beam or gooseneck 26 can thus be adjusted to meet the height of various types of supporting tractor units which may be used. The rear powered tractor 10 may be replaced by an unpowered vehicle or dolly if desired, but we have found it advantageous to use a powered rear vehicle which can assist movement of the train at curves or when the train turns at an intersection by providing a pushing force at the rear of the train. The hinged connection of the transverse channel member 36 and the battery of spring units 30 permit automatic adjustment of the walking beam while the load is being hauled by the tractor train over uneven or rough roads, while at the same time the load will be uniformly distributed over all the wheels of the tractor train as previously described.

It is to be understood that changes and modifications may be made in the specific details of the units previously described which are intended to be included within the scope of the appended claims.

We claim:

1. A tractor-trailer train comprising a low bed trailer adapted to carry heavy loads, said low bed trailer having a low hung platform supported by a front extension and a rear extension integral with said low bed trailer, spring means positioned at the rear end of said platform, a fulcrum support on said rear extension of the low bed trailer, a walking beam supported on said fulcrum, said walking beam having its front end extending over said spring means, said spring means being adapted to exert a predetermined upward thrust on said walking beam, the rear end of said walking beam being provided with a fifth wheel, said fifth wheel being supported upon a wheeled vehicle for supporting the load transmitted by said walking beam.

2. A tractor-trailer train comprising a low bed trailer adapted to carry heavy loads, said low bed trailer having a low hung platform supported by a front extension and a rear extension integral with said low bed trailer, a plurality of adjustable springs positioned at the rear end of said platform, a fulcrum support on said rear extension of the low bed trailer, a walking beam supported on said fulcrum, said walking beam having its front end extending over said spring means, said spring means being adapted to exert a predetermined upward thrust on said walking beam, the rear end of said walking beam being provided with a fifth wheel, said fifth wheel being supported upon a wheeled vehicle for supporting the load transmitted by said walking beam.

3. A tractor-trailer train comprising a low bed trailer adapted to carry heavy loads, said low bed trailer having a low hung platform supported by a front extension and a rear extension integral with said low bed trailer, a plurality of springs precompressed to a predetermined degree positioned at the rear end of said platform, a fulcrum support on said rear extension of the low bed trailer, a walking beam supported on said fulcrum, said walking beam having its front end extending over said spring means, said spring means being adapted to exert a predetermined upward thrust on said walking beam, the rear end of said walking beam being provided with a fifth wheel, said fifth wheel being supported upon a wheeled vehicle for supporting the load transmitted by said walking beam.

4. A tractor-trailer train comprising a low bed trailer adapted to carry heavy loads, said low bed trailer having a low hung platform supported by a front extension and a rear extension integral with said low bed trailer, spring means positioned at the rear end of said platform, a fulcrum support on said rear extension of the low bed trailer, a walking beam supported on said fulcrum, said walking beam being provided with a transverse channel member in engagement with said spring means, said spring means being adapted to exert a predetermined upward thrust on said channel member, the rear end of said walking beam being provided with a fifth wheel, said fifth wheel being supported upon a wheeled vehicle for supporting the load transmitted by said walking beam.

5. A tractor-trailer train comprising a low bed trailer adapted to carry heavy loads, said low bed trailer having a low hung platform supported by a front extension and a rear extension integral with said low bed trailer, spring means positioned at the rear end of said platform, a fulcrum support on said rear extension of the low bed trailer, a walking beam supported on said fulcrum, said walking beam being provided with a transverse member hingedly connected thereto and in engagement with said spring means, said spring means being adapted to exert a predetermined upward thrust on said transverse member, the rear end of said walking beam being provided with a fifth wheel, said fifth wheel being supported upon a wheeled vehicle for supporting the load transmitted by said walking beam.

6. A tractor-trailer train comprising a low bed trailer adapted to carry heavy loads thereon, said low bed trailer having a low hung platform supported by a front extension and a rear extension integral with said low bed trailer, a fifth wheel on said front extension, a dolly for supporting said fifth wheel, said dolly having an extension provided with a fifth wheel, a leader tractor provided with a rear extension, said extension being adapted to support the fifth wheel of said dolly, spring means positioned at the rear end of said low bed trailer platform, a fulcrum support on said rear extension of the low bed trailer, a walking beam supported on said fulcrum, said walking beam having its front end extending over said spring means, said spring means being adapted to exert a predetermined upward thrust on said walking beam, the rear end of said walking beam being provided with a fifth wheel, said fifth wheel being supported upon a wheeled vehicle for supporting the load transmitted by said walking beam.

References Cited in the file of this patent

UNITED STATES PATENTS

| 1,877,126 | Greer | Sept. 23, 1932 |
| 2,116,412 | Reid | May 3, 1938 |
| 2,351,151 | Sattler | June 13, 1944 |

FOREIGN PATENTS

| 985,163 | France | Mar. 7, 1951 |